United States Patent [19]

DuFrene

[11] Patent Number: 4,573,892

[45] Date of Patent: Mar. 4, 1986

[54] ROTARY FLUID DEVICE WITH AXIALLY SLIDING VANES

[75] Inventor: Clement O. DuFrene, Cottage Grove, Minn.

[73] Assignee: Gordon Rosenmeier, Little Falls, Minn. ; a part interest

[21] Appl. No.: 746,467

[22] Filed: Jun. 20, 1985

Related U.S. Application Data

[63] Continuation of Ser. No. 677,553, Dec. 3, 1984, abandoned, which is a continuation-in-part of Ser. No. 526,340, Aug. 25, 1983, Pat. No. 4,534,436.

[51] Int. Cl.$^4$ ............................................. F01C 1/00
[52] U.S. Cl. .................................................. 418/219
[58] Field of Search ......................... 418/217, 219, 229

[56] References Cited

U.S. PATENT DOCUMENTS

| | | |
|---|---|---|
| 171,775 | 1/1876 | Chalfant . |
| 750,219 | 1/1904 | von Pittler . |
| 764,551 | 7/1904 | Bot, Jr. . |
| 1,683,962 | 9/1928 | Crown ................................ 418/219 |
| 1,743,977 | 1/1930 | Petersen ............................. 418/219 |
| 1,859,333 | 5/1932 | Josephs, Jr. . |
| 2,154,456 | 4/1939 | Knapp ................................ 418/219 |
| 2,213,271 | 9/1940 | Davis . |
| 2,633,803 | 4/1953 | Carey . |
| 2,753,848 | 7/1956 | Burton . |
| 2,869,472 | 1/1959 | Hartmann . |
| 2,900,961 | 8/1959 | Sung . |
| 2,988,059 | 6/1961 | Wysong, Jr. . |
| 3,205,663 | 9/1965 | Kluge . |
| 3,225,700 | 12/1965 | Cech, Sr. . |
| 4,028,028 | 6/1977 | Fuchs, Jr. ........................... 418/219 |

FOREIGN PATENT DOCUMENTS 527687  7/1955  Italy ..................................... 418/219

Primary Examiner—John J. Vrablik
Attorney, Agent, or Firm—Robert C. Baker

[57] ABSTRACT

A rotary fluid motor or pump device having opposing cam surfaces and a rotor with vanes shiftable within vane slots of the rotor and riding on the cam surfaces is disclosed. The device includes at least eight vane members circumferentially spaced about the rotor and cam surfaces having diametrically opposed slopes extending over arcs of at least about 130°, with means for the entrance or exit of fluid along the entire length of each such slope of 130° or more. At least six chamber spaces between vanes of the device always function to receive fluid and at least six such chamber spaces always function to exit fluid from the device, regardless of the rotary orientation of the rotor. A device for hydraulically assisting the steering vehicles is provided wherein rotary valve elements and rotary motor elements are concentrically mounted about a steering shaft.

3 Claims, 9 Drawing Figures

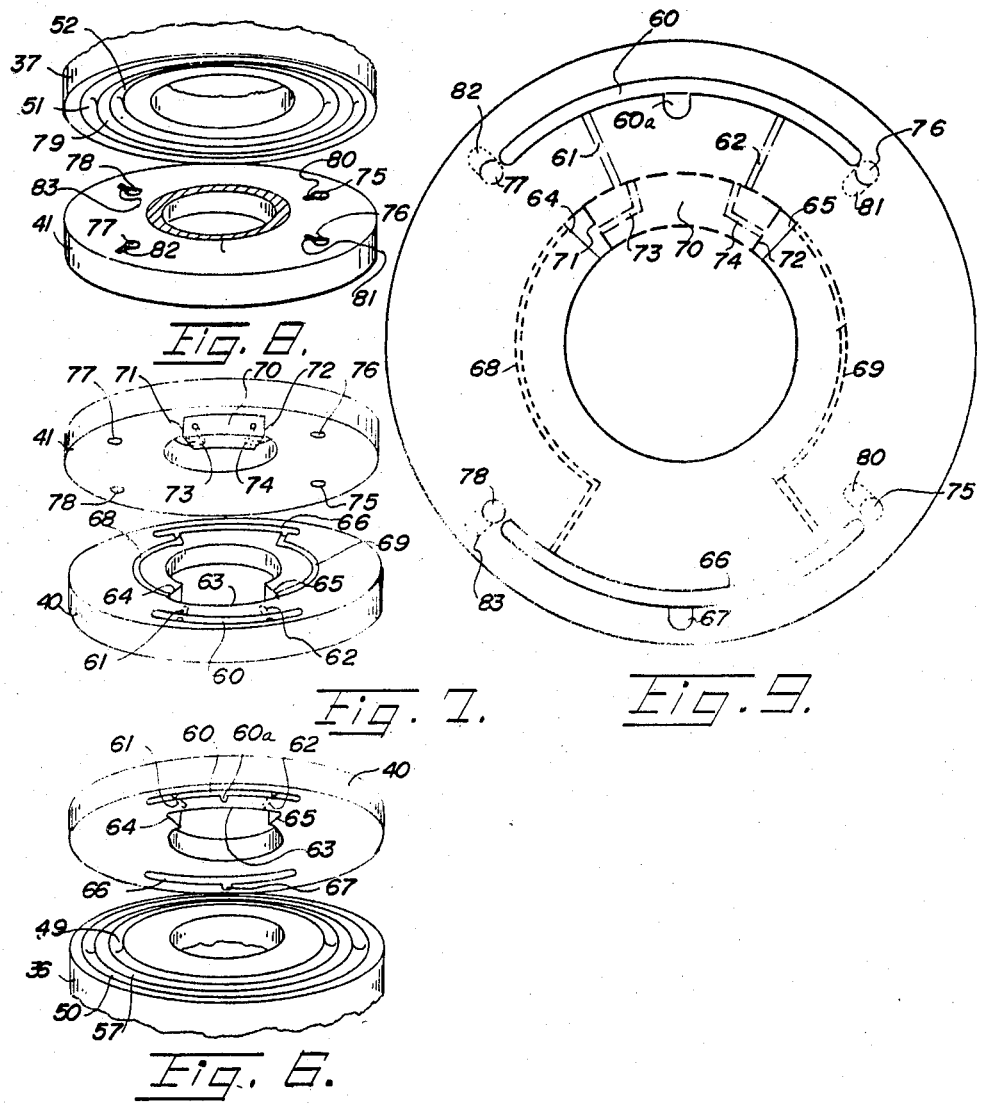

ROTARY FLUID DEVICE WITH AXIALLY SLIDING VANES

This application is a continuation of application Ser. No. 677,553 filed Dec. 3, 1984, now abandoned, which is a continuation-in-part of my application Ser. No. 526,340 filed Aug. 25, 1983, now U.S. Pat. No. 4,534,436.

BACKGROUND OF THE INVENTION

This invention relates to rotary fluid devices. More particularly, the invention relates to a rotary fluid motor or pump device having a rotor which carries slidable vane members that shift in a non-radial direction during rotation of the rotor. The invention also relates to a new hydraulic steering system for vehicles, and one particularly characterized by the fact that it incorporates a rotary fluid valve and rotary fluid motor in a housing capable of being easily mounted on a steering shaft, either at initial vehicle manufacture or subsequently.

Rotary fluid pumps or motors of the axially sliding vane type have been proposed heretofore. Insofar as is known, those heretofore proposed have had their work function limited in essence to single vanes diametrically opposed. Some have employed extremely rapid shift of the vanes and sharp changes of cam slope as a claimed benefit. Other designs have employed complex porting of fluid through a rotor against sides of the vanes within the rotor to overcome their problem of vane binding and resistance to sliding. No known pumps or motors have the simplicity of structure and force distribution features characteristic of the rotary fluid motors or pumps of this invention.

Fluid devices of this invention have an extraordinary range of uses. For example, a rotary motor of the invention may be mounted on the axle of wheels of vehicles and employed for powering vehicle movement and braking. The fluid pumps or motors of the invention are capable of almost infinite variations of speed. As a motor, they are particularly useful for purposes such as driving conveyors or cables or other devices where variation of the rate of movement is necessary or desirable with substantially equal power or work force regardless of the rate of motor rotation.

SUMMARY OF THE INVENTION

The rotary fluid rotor or pump device of the invention comprises a housing having walls defining a circular interior cavity with opposing contoured annular cam surfaces equi-distantly spaced from each other at all points of equal radii from the center of the cavity. A shaft extends from the exterior of the housing into the cavity and is journaled in the walls of the housing in any suitable manner. A rotor is concentrically mounted on the shaft at a location within the cavity between the opposing cam surfaces. The rotor divides the cavity into two opposing chambers with the rotor therebetween. Further, the rotor has at least eight radial slots equally spaced circumferentially about the peripheral portion thereof. A slidable vane member is located in each slot of the rotor; and each vane member extends as a wall between the opposing contoured annular cam surfaces of the cavity. Two separated fluid passage systems extend through the walls of the housing. Each system has a port in communication with each chamber of the cavity.

Each opposing cam surface of the cavity has a valley portion spaced from the rotor and a diametrically opposed hill portion nearest the rotor. Between the valley and hill portions of each cam surface are diametrically opposed uniformly graduated slopes, each extending over a circumferential arc of at least about 130°.

Further, never less than two of the slidable vane members are at a location along each slope of each cam surface of a cavity, regardless of the rotational orientation of the rotor.

Still further, a circumferential arc no greater than about 50° separates the port of one fluid passage system from the port of the other fluid passage system in communication with a chamber. Each such port of communication is adjacent the end of a cam slope located nearest the rotor. In other words, each port is adjacent the hill portion or plateau of each cam surface. Each such port includes means or conduiting for chamber communication over an arc substantially equal to the arc of the cam surface slope with which the port is associated.

The arrangement is such that at least six chamber spaces between vane members of the device are always functioning to receive fluid and at least six such chamber spaces are always functioning to exit fluid at all times during rotation of the rotor. In fact, never less than four vane members always are actively associated with both the receiving and the exiting of fluid in and out of the two opposed chambers of the motor or pump device.

In the embodiment of the invention particularly directed to hydraulic steering, a rotary hydraulic valve and rotary hydraulic motor, preferably within a single housing, are concentrically mounted about a steering shaft.

Additional features and relationships and advantages of the invention will become evident as this description proceeds.

BRIEF DESCRIPTION OF DRAWINGS

FIGS. 6, 7, and 8 are schematic perspective views of rotary control valve structural features at the respective interfaces labeled X, Y, and Z of FIG. 5, with each interface partially open and viewed as one would view the internal characteristics of a partially open clam shell; and FIG. 9 is a schematic representation taken along the X interface of FIG. 6, looking upwardly from that interface and illustrating only the passage or port relationships and features of the adjustable valve assembly members of the control valve apparatus, with discontinuous lines outlining those members.

DESCRIPTION OF PREFERRED EMBODIMENTS

Fluid Motor or Pump Device

Figure 1:
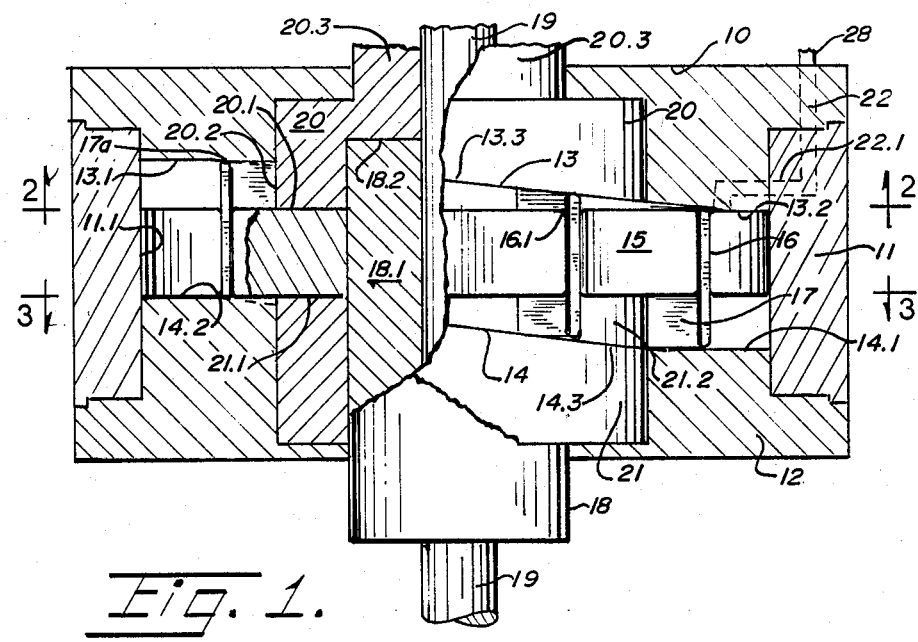
FIG. 1 is a schematic sectional view taken along a plane through the axis of the fluid pump or motor of the invention, and includes a showing of some parts of internal structure in full side view and some partially broken away.

Throughout the drawings, the same number is applied to the various views of the same part or structure.

Referring particularly to FIGS. 1 through 4 inclusive, the housing of the fluid motor or pump device suitably has an upper 10 and a lower 12 disk-like or circular end plate member. These end plates are appropriately gasketed and fastened as by bolts to an intermediate cylindrical wall 11. Fixed to the upper and lower end plates at their interior surfaces are cam structures which form cam surfaces 13 and 14. For the purpose of description, the cam structures are considered part of the housing, for they are unified in an immovable manner to housing elements. These cam surfaces suitably are formed by machining the interior of the upper and lower plate structures. However, they may separately be formed and then unified to the upper and lower plates by any suitable means. Effectively, the housing has walls made up of a cylindrical intermediate wall member 11 and opposing end plates 10 and 12 which define, by virtue of the nature of their interior surfaces, an interior circular cavity. This cavity has opposing contoured annular cam surfaces 13 and 14. These opposing cam surfaces are equi-distantly spaced from each other at all points of equal radii from the center of the cavity. Stated another way, the annular opposing cam surfaces are in a contoured parallel alignment.

A rotor 15 divides the cavity into upper and lower chambers on opposite sides of the rotor. Slots 16 in the rotor carry vanes 17. The rotor has a hollow shaft 18 fixed to it for rotation with it. Inside the hollow shaft 18 is illustrated a central shaft 19 which suitably is coupled to the hollow rotor shaft 18 (as explained hereinafter) for common rotation with the rotor shaft and rotor. Any suitable splining or locking of these parts together may be employed. As illustrated, the hollow shaft 18 of the rotor extends at 18.1 through the rotor and terminates as a upper surface 18.2 which projects above the plane of the rotor 15. The essential point, however, is that some sort of shaft is centrally located in the rotor.

An annular bushing member 20 is friction-fitted within an annular recess of the upper plate 10 at a location radially inward of the cam surface 13 of the upper plate assembly. This annular bushing 20 provides a bushing surface 20.1 against which a radially inward portion of the upper surface of the rotor 15 is adapted to rotate. As illustrated, a portion of this bushing 20 is provided with a radially inward shoulder and a further annular portion 20.3 which extends upward as an annular member about the central shaft 19. From a functional standpoint, the outer or perimeter annular surface of bushing 20 forms an inner race 20.2 for the radially inward edge of the vanes 17 during their movement into the upper chamber above the rotor 15.

An annular bushing 21 is likewise friction-fitted into the structure of the lower plate 12 at a radially inward location but radially outward from the hollow shaft 18 of the rotor. This annular bushing 21 provides an upper bushing surface 21.1 against which a radially inward portion of the lower surface of the rotor is adapted to rotate. Similarly to the bushing 20, the bushing 21 provides an inner race surface 21.2 against which the inner edge of the vanes 17 rides in the lower cavity of the device.

The base elements of structure for the fluid motor or pump device therefor are a housing formed by an upper plate 10, a lower plate 12, and an intermediate cylindrical or sleeve wall section 11. This housing has interior surfaces which define a cavity of circular or annular nature. A shaft 18 is appropriately journaled in the walls of the housing and extends into the interior of the cavity. On the shaft 18 is concentrically mounted a rotor 15. The rotor is located between the opposing cam surfaces inside the cavity, and divides the cavity into two opposing chambers. The rotor has eight or more radially oriented slots 16 equally spaced circumferentially about the peripheral portion thereof. Within each slot is a slidable vane member 17. The axial length of the vane members is such that they extend as a wall between the opposing parallel contoured annular cam surfaces 13 and 14.

An outer race 11.1 for the vanes of the rotor is formed by the interior of the wall 11 of the intermediate sleeve or cylindrical portion of the housing. The inner race for the vane members 17 is formed by the radially outward surface of the bushing members 20 and 21. Importantly, the radial distance or extent of the slots for the rotor as well as the radial distance between the inner and outer race surfaces for the slidable vane members should be approximately equal, although minor variations permitting some fluid passage or leak are permissible, and even desirable for lubrication purposes, especially where oil or like liquid is employed in the pump or motor. Basically, however, the slidable vane members 17 extend more or less as a wall between the opposing contoured annular cam surfaces 13 and 14 as well as between the outer race surface 11.1 and the inner race surfaces 20.2 and 21.2.

Preferably, the ends 17a of the vanes contacting the opposing cam surfaces 13 and 14 are somewhat rounded from front to back (i.e., over the edge of the vanes; see FIG. 1) so as to provide a line contact against the opposing cam surfaces 13 and 14. This is done to facilitate smooth movement of those ends along the slope of the opposing cam surfaces and avoid binding resistance to movement. The rounded edge also contributes to fluid lubrication of the contacting surfaces. Further, enhancement of fluid lubrication for vane shifts within slots 16 of the rotor is achieved by slight rounding or chamfering of the edge 16.1 between the plane of the rotor and the slot therein (see FIG. 1). This contributes to the action of fluid flowing into the slots for lubrication as the vanes shift therein.

Within the walls of the housing are located two separated fluid passage systems. These systems are not easily illustrated in a view such as FIG. 1; and for that reason, FIG. 1 only sets forth a schematic suggestion of a fluid passage system. In FIG. 1, the schematic showing includes an entry port 28 into the housing for one such fluid system, plus a depending or vertical passage 22, and a radially inward passage 22.1. For understanding of the nature of the fluid passage systems, discussion will now be centered on FIGS. 2, 3, and 4.

Figure 2:
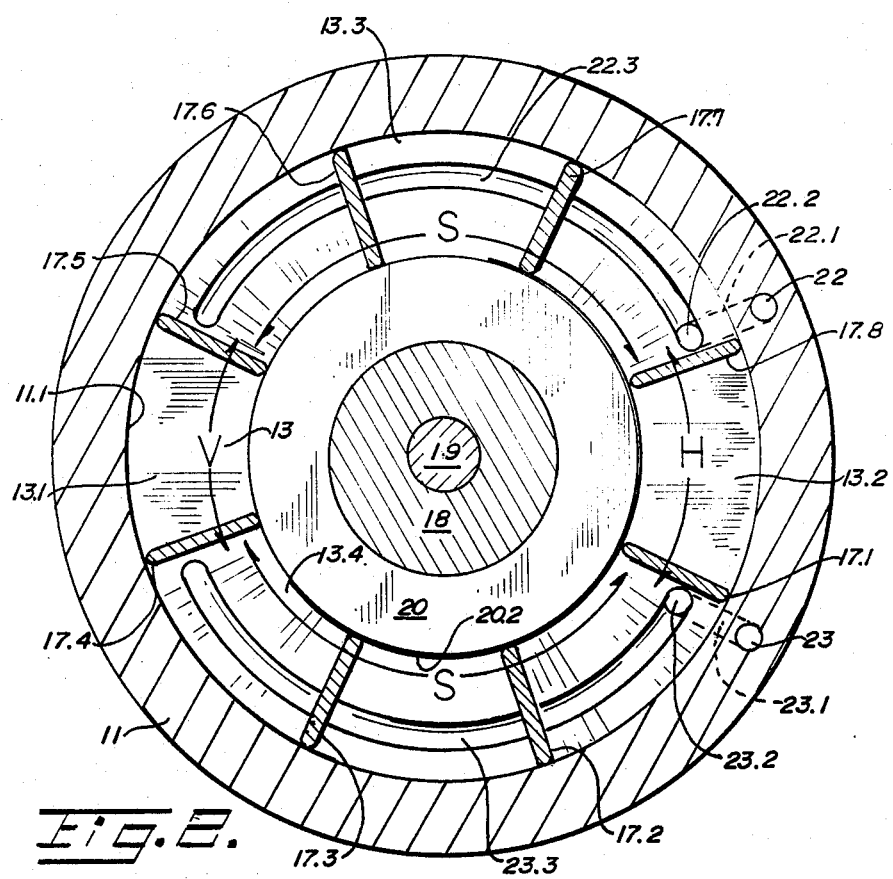
FIGS. 2 and 3 are sectional views taken along lines 2—2 and 3—3 of FIG. 1, respectively, particularly illustrating circumferential relationships and communication passages and ports, including the conduiting means of the ports.

Starting with FIG. 2, which is a view looking upward along the plane 2—2 of FIG. 1, we have the intermediate cylindrical wall 11 which forms the outer race surface 11.1 for the vane members 17. The vane members 17 are identified by numerals 17.1 through 17.8 in FIG. 2. To be recognized is that the two vanes identified 17.1 and 17.8 are schematically shown in FIG. 2 but, in essence, it is only the upper edge of these two vanes which meets the plane 2—2 from which the FIG. 2 is taken. Also shown in FIG. 2 is the inner race 20.2 of the bushing 20 and the hollow shaft 18 for the rotor as well as the central shaft 19.

Before proceeding further in orienting one to the view of FIG. 2, it must be emphasized that the opposing cam surfaces 13 and 14 are identical in nature but oriented at 180° with respect to each other so as to provide a uniformly equi-distant spacing between those cam surfaces at all points of equal radii from the center of the cavity within the housing.

The cam surface 13 (see FIGS. 1 and 2) has a valley portion 13.1 and a hill portion 13.2 in diametrically opposed relationship. The characterization "valley" is intended to refer to that portion 13.1 which is most removed or spaced from the rotor 15 (see FIG. 1); and the characterization "hill" is intended to refer to that portion 13.2 of the cam surface nearest or adjacent the rotor 15. Suitably these valley and hill portions of the annular cam surface are flat surfaces, with the hill portion 13.2 in more or less an abutting relationship against the upper flat surface of the rotor 15. The arc length of both the valley and hill portions is the same. For example, where eight vanes are employed and have an arc or circumferential spacing of approximately 45°, the arc length V of the valley portion of the cam surface will be approximately but no more than about 50°; and likewise, the arc length H for the hill portion will be approximately but no more than about 50°. Between the valley portion 13.1 and the hill portion 13.2 of the cam surface 13 are uniformly graduated arcuate slopes extending over an arc length S of at least approximately 130°. Thus each slope 13.3 and 13.4 from the hill portion 13.2 to the diametrically opposed valley portion 13.1 is of uniformly sloping character throughout. In fact, slopes 13.3 and 13.4 are identical but mirror images of each other.

One slope 13.3 is in communication with a fluid passage system having a vertical channel 22 in the housing walls. This fluid passage system connects with a radially inward passage 22.1 in the housing walls and then to port 22.2 which communicates with the interior of the chamber above the rotor. Illustratively, port 22.2 is on the surface of the graduated slope of the cam at a location near the hill portion 13.2. Further, port 22.2 continues as a conduit or channel or groove 22.3 in the surface of the cam 13 along the entire arc of the slope 13.3 (i.e., along the 130° arc of that slope). Similarly, another but separate fluid passage system having a vertical conduit or passage 23 in the walls of the housing is connected by means of a radial passage 23.1 to a port 23.2 and its continuation as a conduit or groove 23.3 along the entire 130° arc length of the sloped cam surface 13.4.

Especially significant is the long arc length of the slopes 13.3 and 13.4 of the cam surface 13, and the fact that at least 2 vanes and sometimes 3 vanes of an eight vane rotor assembly inherently are located on and sliding over each slope 13.3 and 13.4 during rotation of the rotor 15. The movement of vanes on the slopes 13.3 and 13.4 inherently causes a change in the volume of the space between those vanes. That volume change is in proportion to the distance between the upper surface of the rotor and the cam surface 13 at different locations along the slopes 13.3 and 13.4. Thus, regardless of the rotation of the rotor, grooves 22.3 and 23.3 will allow passage of fluid to or from spaces between vanes as the vanes move along slopes 13.3 and 13.4.

Figure 3:
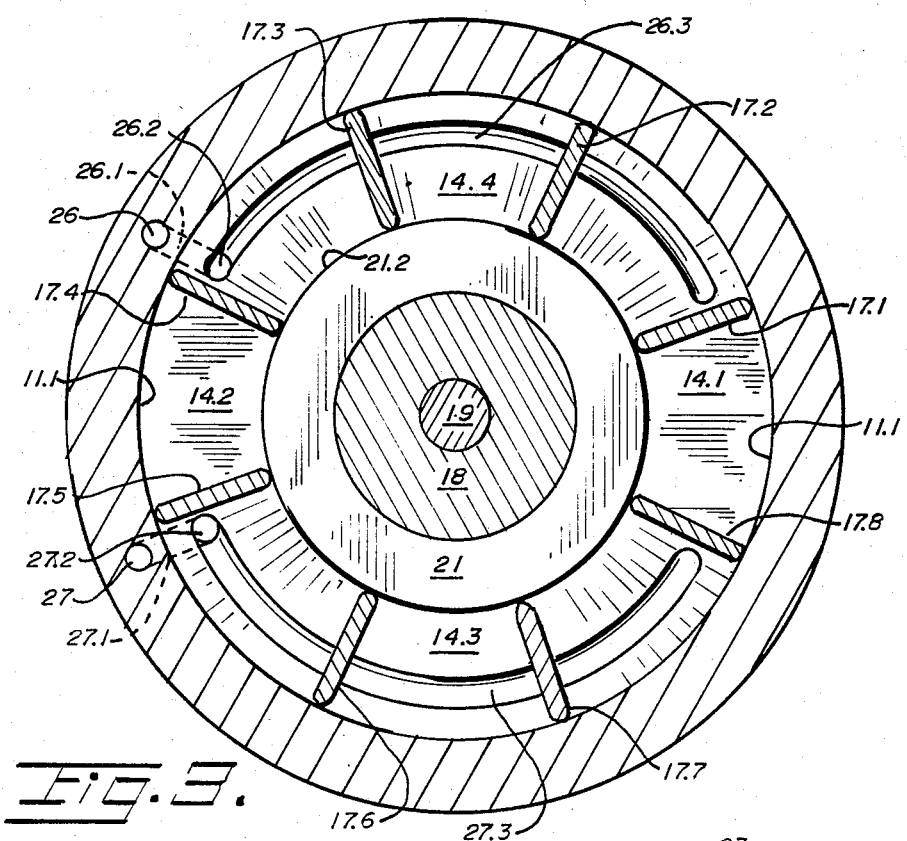

Refer now to FIG. 3. Observe that it appears to be almost identical to FIG. 2, except that the cam surface 14 is oriented at 180° with respect to the cam surface 13 in FIG. 2. That is precisely the fact. What this means is that valley portion 14.1 of cam 14 is diametrically opposed to valley portion 13.1 of cam 13 and is likewise of an arc length of approximately but no more than 50°. The same relationship and arc length apply to hill portion 14.2 of cam 14 with respect to hill portion 13.2 of cam 13. Similarly, cam slopes 14.3 and 14.4 are uniformly graduated slopes of an arc length of at least 130°, that is, the same arc length as the slope arcs 13.3 and 13.4 of cam surface 13. Further, one fluid passage system in the walls of the housing has a vertical passage 26 feeding to a radially inward passage 26.1 and port 26.2 on slope 14.4 near hill portion 14.2, with port 26.2 continuing as a conduit or groove 26.3 along the entire arc of the slope 14.4. Likewise, a vertical passage 27 of the other fluid passage system in the walls of the housing connects with radially inward passage 27.1 and port 27.2 on slope 14.3 near the hill portion 14.2, with port 27.2 continuing as a conduit or groove 27.3 along the entire arc of slope 14.3. Thus, the lower chamber (below rotor 15) of the housing has structural and passage communication features essentially identical to the upper chamber, but at an orientation of 180° from the upper chamber.

Figure 4:
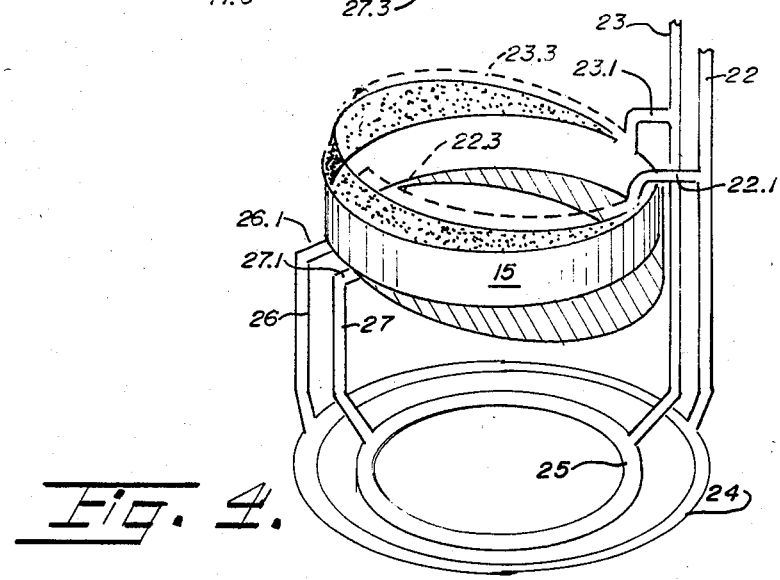
FIG. 4 is a schematic perspective graphic view particularly illustrating the relationship between the fluid passage systems and ports and chambers of the pump or motor of FIGS. 1, 2, and 3.

Consider now the showing of FIG. 4 in combination with FIGS. 1, 2, and 3. One fluid passage system is fed by housing vertical passage 22 which connects to housing vertical passage 26 via annular passage 24. The other fluid passage system is fed by housing vertical passage 23 which connects to housing vertical passage 27 via annular passage 25. Vertical passages 22 and 23 extend to the exterior of the housing and are connected to any suitable fluid control means for feeding and receiving fluid. If fluid is incoming in passage 22, it is outgoing in passage 23, and vice versa. If passage 22 carries incoming fluid, that fluid enters the upper chamber as aforedescribed (on slope 13.3 near hill 13.2) and also passes through passages 24 and 26 and 26.1 into the lower chamber on the opposite side of rotor 15. Both the upper and lower chambers therefore receive that incoming fluid. If that incoming fluid is under pressure (i.e., a motor operation for the fluid device), it will press against the vane 17.7 in the upper chamber (see FIG. 2) and vane 17.3 in the lower chamber (see FIG. 3), effecting therefore a clockwise rotation of rotor 15 as viewed looking downward from the top of FIG. 1. Simultaneously, the incoming fluid under pressure moves through groove 22.3 of the upper chamber cam surface 13 and groove 26.3 of the lower chamber cam surface 14, and effectively presses against vanes 17.6 and 17.5 in the upper chamber and against vanes 17.2 and 17.1 in the lower chamber. In all, therefore, the pressurized incoming fluid presses against three vane members in the upper chamber and three vane members in the lower chamber as it enters the fluid device operating as a motor. Regardless of the rotary orientation of rotor 15 (whether at about 22 ½° from that illustrated in FIGS. 2 and 3 or otherwise) the long arc length of the grooves of the cam slopes distributes incoming fluid behind at least three vane members in the upper chamber and at least three in the lower. The result is that six of the vane members are actively being pushed by the pressurized incoming fluid as it fills up the spaces between those vane members. The significance of this is that the work forces are distributed over two diametrically opposed circumferential arcs, each at least about 130°, or a total circumferential extent of at least about 260°. Stated another way, at least six chamber spaces between vanes (three above the rotor and three below it) are always functioning to receive fluid.

Similarly, exiting fluid is always pressing against three vane members in the upper chamber and three in the lower, with at least six chamber spaces between vanes always functioning to exit fluid. Thus the work forces of exiting fluid are likewise distributed over two diametrically opposed arcs, each at least about 130°. Interestingly, each vane 17, apart from their moments of rest at the hill and valley portions of the cam surfaces, is subjected to both incoming and exiting fluid. Take for example vane 17.2 in motor operation of the device, and assume clockwise rotor rotation when viewed looking down from the top of FIG. 1. That vane 17.2 (at its location in FIGS. 2 and 3) acts at its upper portion in the upper chamber to push fluid out port 23.2 into wall radial passage 23.1 and wall vertical passage 23. But at its lower portion in the lower chamber, it is being pushed by incoming fluid entering through passage 26 and passing in groove 26.3. That same vane 17.2, in pump operation of the device, and assuming the same clockwise rotation, acts (at its orientation in FIGS. 2 and 3) in the upper chamber to push fluid out port 23.2 into passage 23.1 and then passage 23 (i.e., the same action as for motor operation). In the lower chamber, however, during pump operation, vane 17.2 pulls fluid into the lower chamber.

Thus, the upper and lower portions of each vane project out from opposite sides of the rotor during the transit of the vane over the long gradual cam surface slopes. In the case of motor operation, the circumferentially oriented fluid forces acting on those projecting portions in the upper chamber are opposed to those acting on the same vane in the lower chamber. But in the case of pump operation (where the power is applied to shaft 18 to turn rotor 15), those forces effected by the fluid are in the same circumferential direction in both chambers. These principles remain valid regardless of the direction of rotation of the rotor 15.

Significantly, one fluid passage system through the walls of the housing connects with the port means 26.2 into the lower chamber as well as the port means 22.2 into the upper chamber at locations diametrically opposed and near the end of the slope of the cam surfaces located nearest the rotor; and the other fluid passage system connects with the port means 23.2 and 27.2 into each chamber at diametrically opposed locations and at a location near the end of the other of the slope structures of each cam surface nearest the rotor. This arrangement separates the port means of one fluid passage system from the other by a circumferential arc of no greater than about 50°.

The long slopes of the cam surfaces provide exceedingly smooth operation for the rotary motor or pump device. Slopes of greater arcuate length than 130° (even approaching 180°) may be employed between the diametric hill and valley portion of each cam surface, provided the same arcuate length is employed for all cam surface slopes in the device. A snug or close relationship between hill portions of the cam surfaces and sides of the rotor is preferred, but not critically necessary. Preferably, the distance between opposing cam surfaces at any circumferential orientation is less than twice the thickness of the rotor at a vane slot portion thereof. More than 8 vanes equally spaced in the rotor are useful and improve smoothness of operation, particularly when the cam slopes are also increased in length. Great economy in the manufacture of the device as a pump or motor arises from the fact that imperfect fit between moving parts can be tolerated without destroying operability as a liquid pump or motor.

HYDRAULIC STEERING

Figure 5:
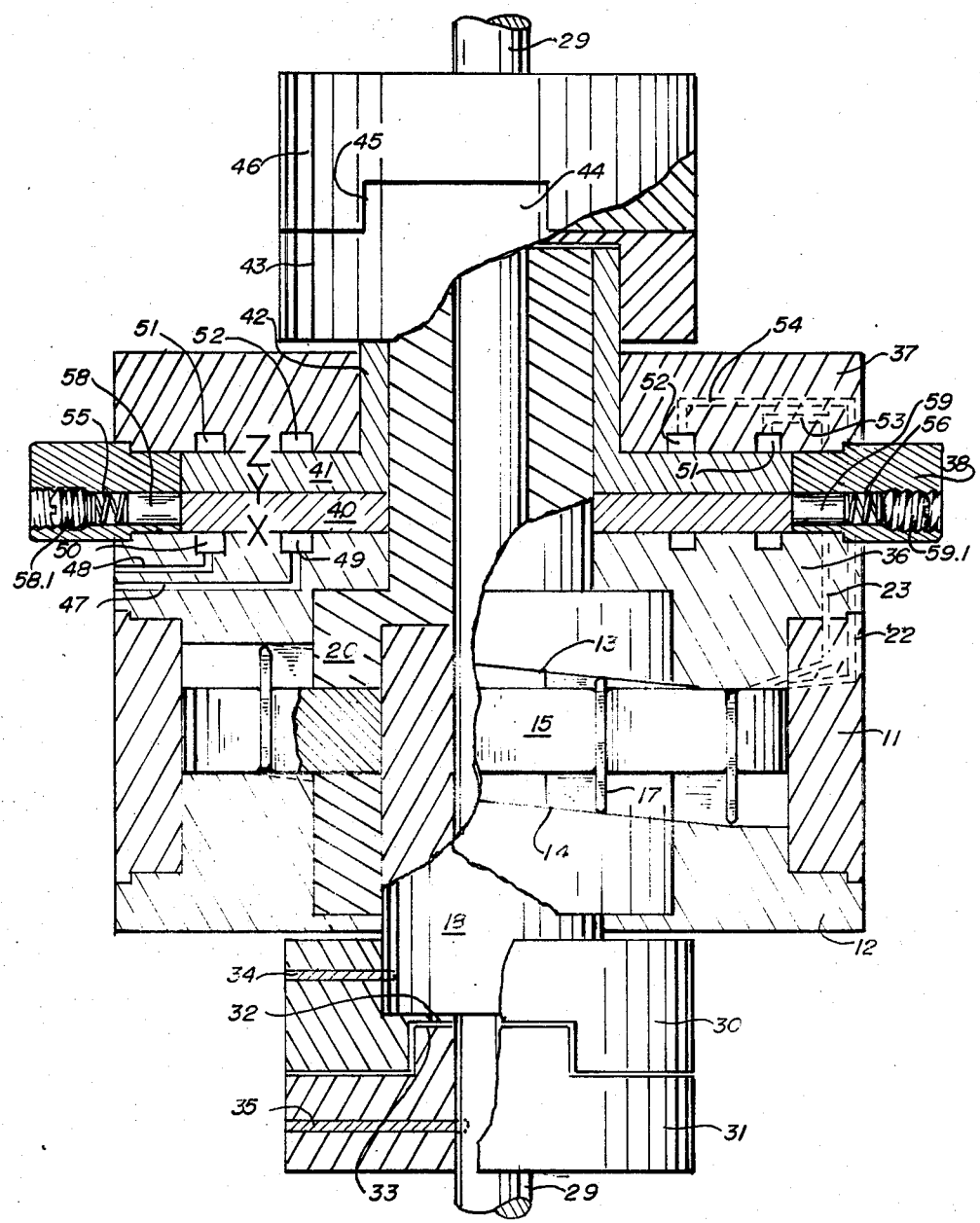
FIG. 5 is a schematic sectional view taken along an axis plane (with some parts shown in full side view and some partially broken away) of a hydraulic steering assembly having a rotary control valve and rotary motor in a housing concentrically mounted on a steering shaft.

Although other rotary fluid motors may be employed in the steering embodiment of this invention, the preferred type is the fluid motor previously discussed; and like numbers are given all motor elements of FIG. 5 which are the same as the motor elements of FIGS. 1 through 4, inclusive.

The central shaft 29 is a steering shaft of conventional type for motor vehicles and has a steering wheel (not shown) at its upper end.

The hollow shaft 18 of the rotor is coupled to the central steering shaft 29 by a coupling assembly consisting of annular ring members 30 and 31 having an interlocking fit between recess 32 of part 30 and mating projection 33 on part 31. Part 30 is securely fastened to hollow rotor shaft 18 by any suitable means such as a pin 34; and part 31 is secured to steering shaft 29 by means such as a pin 35. A flexible cushion layer may be interposed betweens the interlocking parts to permit some play of movement between the hollow shaft 18 and steering shaft 29, if desired.

Above the motor and located annularly about the central steering shaft 29 is a rotary hydraulic control valve of the type disclosed in my U.S. patent application Ser. No. 526,340, filed Aug. 25, 1983, the disclosure of which is here incorporated by reference. The housing for this rotary valve is integrated structurally with the housing for the motor; and in this respect, an annular plate-like member 36 functions as both the upper plate of the motor (comparable to plate 10 of FIG. 1) and as the lower or base plate or housing element for the valve members. An annular plate-like cap 37 and a retaining ring or peripheral sleeve body 38 (including opposing threaded openings for adjustment screws 58.1 and 59.1) complete the external housing structure of the hydraulic steering assembly.

Within the housing portion defined by plates 36 and 37 and retaining ring or sleeve 38 are two valve members, namely, a follower or driven valve member 40 and a driver valve member 41. A driver extension in the form of a sleeve 42 extends outwardly from the housing. On this sleeve 42 is fixed, as by a pin or key, a lower annular coupling member 43 having a mating projection 44 which interlocks with recess 45 in the upper annular coupling member 46 which is fixed, as by a pin or key, on steering shaft 46. A cushion layer may be interposed between the mating parts to introduce some flexibility of movement for the steering shaft (and steering feel for an operator) before effecting steering rotation of driver valve member 41.

The upper bushing 20 of the motor has an extension sleeve 20.3 projecting upward as an annular hydraulic seal member against the sleeve 42 and in spatial relationship about the steering shaft 29. This bushing assembly 20 is fixed to the motor housing; and all parts of the housing are secured together as by bolts and are nonrotating. Any suitable bracket (not shown) is used to fasten the housing to a vehicle frame element so as to prevent its rotation.

Hydraulic fluid enters the housing through supply passage 47 which is connected in any suitable way to a reservoir source of hydraulic fluid under pressure (as by a hydraulic pump). Passage 48 is the return passage for returning spent fluid from the assembly back to the reservoir source.

The fluid incoming through passage 47 passes into an annular valve facing supply groove or passage 49 in the upper face of plate 36, which annular groove 49 is open to the X interface between the plate 36 and the follower valve member 40. Return or spent fluid exiting the follower valve member 40 passes into an annular return groove or passage 50 in the upper surface of the housing member 36.

The cap or upper housing 37 carries two annular action-fluid passages 51 and 52, both being grooves into the valve-facing surface of the upper housing 37. These coaxial annular action passages communicate respectively through radial housing passages 53 and 54 to schematically illustrated vertical passage 22 to the motor and schematically illustrated vertical passage 23 to the motor, both discussed in connection with FIGS. 1 through 4, inclusive.

A means also is provided for imparting some resistance to the movement of the follower or driven valve member 40; and this is illustrated as consisting of two diametrically opposed unabrasive brake blocks or segments 58 and 59 pressed against the outer circumference of valve member 40 by coil springs 55 and 56 which may be adjusted by adjustment screws 58.1 and 59.1 to vary the resistance applied by segments 58 and 59.

Referring to FIG. 6, the face surface of the plate 36 at the X interface has a land surface 57 between the annular grooves 49 and 50. An arcuate inlet passage 60 extends entirely through the follower and rests in mating relationship over the land area 57 of the plate 36; but this arcuate passage 60 is in constant communication with the supply groove 49 through a grooved radial extension 60a. Metering passages 44 and 45 extend from the arcuate inlet 60 through the wall thickness of follower 40 to a damming cavity, that is, a cavity in which fluid under certain conditions may be dammed up to a degree. This damming of fluid causes a reactive result, and thus the cavity is characterized as a reactive damming cavity. The cavity which serves as part of a damming means is defined by side wall 63 having an arcuate contour and end walls 64 and 65. The innermost side wall of the cavity is effectively formed by the central sleeve 42 (see FIG. 5). An arcuate outlet passage 66 extends entirely through the follower 40. The X interface opening of passage 66 likewise rests upon the land area 57 of the housing 36, but is in constant communication with the annular return passage 50 through a groove 67 in the surface of follower 40 facing the housing plate 36.

At the Y interface showing in FIG. 7, the surface of the follower 40 has equalization grooves 68 and 69 extending from ends 64 and 65 of the damming cavity to the arcuate outlet passage 66. Grooves 68 and 69 permit shift of fluid in either direction. Other elements shown for the follower in FIG. 7 are as discussed for FIG. 6.

Continuing at the Y interface of FIG. 7, the driver 41 is equipped with a metering block or damming block 70 which projects into the damming cavity of walls 63, 64, and 65 without, however, fully occupying that cavity. The end walls 71 and 72 are not as far apart as the end walls 64 and 65 of the damming cavity. Extending through the metering block as L-shaped passages are metering passages 73 and 74. These metering passages empty to opposite end walls of the block 70. Extending through the driver 41 are four action passages or ports 75, 76, 77, and 78. None of these action ports is in communication with any passage of the follower 40 at the Y interface when the valve members 40 and 41 are in their normally neutral condition. In that normally neutral condition, no passages extend through the pair of valve members 40 and 41 for the flow of fluid therethrough to the grooves 51 and 52.

At the Z interface of FIG. 8 is an annular land area 79 between the annular action grooves 51 and 52 at the valve-mating surface of the cap housing 37. Action ports or passages 75, 76, 77, and 78 in the driver extend straight therethrough onto that land area 79. Action ports 75 and 76 communicate to annular groove 52 through radially inward grooves 80 and 81 on the upper surface of driver 41. Action ports 77 and 78 extending through driver 14 communicate to annular groove 51 through radially outward grooves 82 and 83.

In FIG. 9, the relationship of the several passages and ports or communication channels in the two valve members 40 and 41 is illustrated in a superimposed relationship, looking upwardly from the X interface, with the numbering given the various elements the same as in FIGS. 5 through 8 inclusive. Thus, when the valve elements are in what is characterized as a neutral condition, pressurized hydraulic fluid from a suitable source of supply is under pressure within the arcuate inlet cavity 60 of the follower as a result of entering that cavity by way of the groove 60a communicating with annular supply passage 49. But the fluid under pressure in the arcuate passage 60 remains there inasmuch as that passage is oriented between action ports 76 and 77 of the driver 41; and the metering passages 61 and 62 are blocked at their outlet by the block 70 which is in spaced relationship from the end walls 64 and 65 of the damming cavity. Further, the arcuate outlet passage 66, while in constant communication with the annular outlet groove 50 in the upper face of the base housing through a grooved channel 67, is not in communication with either action port 75 or 78 of the driver. However, the driver may be rotated in either direction with respect to the follower member.

Assume that the driver member 41 is rotated in a clockwise direction as FIG. 9 is viewed. Then action port 77 of the driver 41 will be placed in communication with the supply inlet passage 60 of the follower and permit flow of hydraulic fluid therethrough and out groove 82 and through action groove 51 of the upper plate housing 37 through passages 53 and 23 (to the motor) to effect clockwise rotation of the rotor 15 as the motor is viewed looking upwardly from the bottom of FIG. 5. This action therefore effects a hydraulically assisted clockwise rotation of the steering shaft 29 (as it is viewed looking upwardly from the bottom of FIG. 5). Further, action port 75 will simultaneously be placed in communication with the arcuate return passage 66 of the follower, and thus permit fluid returning through passage 22 from the motor to pass through annular action passage 52 and through port 75 into arcuate return passage 66 and out the communicating groove 67 into the annular return passage 50 and ultimately back to a reservoir for recycling. Simultaneously, while the foregoing occurs, metering block 70 which is fixed to the driver is shifted clockwise so as to permit metering flow of fluid from the pressurized inlet arcuate passage 60 of the follower onward through metering passage 62

(of follower 40) and then through metering passage 74 (of the metering block of driver 41) into the space area between the end wall 72 of the metering block 70 and end wall 65 of the damming cavity. While some of the fluid entering that space will bleed off through the equalization channel 69, a sufficient buildup of that fluid under the pressure conditions from the supply source will ultimately shortly cause the entire follower valve member 40 to rotate in the same clockwise direction and to the same extent as that earlier made by the driver 41. The result will be that the buildup of fluid will force the valve elements back to their normally neutral condition illustrated in FIG. 9.

It should also be recognized that the initial clockwise rotary movement of the driver does cause fluid to go through equalization channels 68 and 69 to a limited extent, to accommodate a shift of fluid from the normally equal spaces between the ends of the metering block 70 and the end walls 64 and 65 of the damming cavity within which the metering block 70 is shiftable. In other words, on the assumed clockwise rotation, fluid passes out of the cavity between the walls 72 and 65 at the right in FIG. 9, through equalization passage 69, and enters equalization passage 68 to fill the expanding space between the walls 64 and 71.

Counterclockwise rotation of the driver 41 effects similar flow patterns of fluid, but in the mirror image symmetrical passages. Equalization passages 68 and 69 perform their function, the space between the damming cavity end walls 64 and 71 receives fluid from metering passages 61 and 73, port 76 of the driver is placed in communication with the arcuate inlet 60 of the follower, fluid flows through groove 81 into annular groove 52 and out passages 54 and 22, and then into motor chamber spaces fed by ports 22.2 and 26.2 to effect rotor rotation in the opposite direction to that effected for clockwise rotation. The return of fluid from the motor is through passage 23, annular groove 51, groove 83 and port 78 of the driver, arcuate passage 66 of the follower valve member and its grooved line 67 into the annular return groove 50 of plate housing 37 and out passage 48 to the reservoir (not shown). The metering fluid passing through metering passages 61 and 73 into the damming cavity causes a reactive force which gradually and proportionally moves the follower valve member back to the neutral position illustrated in FIG. 9.

It will be appreciated that resistance brake means (such as brakes 58 and 59) hold the follower against movement when the driver is moved, but do not provide a sufficient resistance to movement of the follower to prevent hydraulic fluid from moving the follower. In essence, the metering passages and reactive damming means form a separate network in the pair of valve members apart from the network of flow for the work-performing fluid which passes through the valve and motor.

Especially to be stressed is the symmetry of design for the rotary motor (and also the rotary valve), the simplicity of the structure and cooperating relationships, and the extraordinary compactness achieved for the functions performed. The coupling of the valve driver to the steering shaft suitably may permit little play or essentially no play or rotary motion of the steering shaft so that the valve driver is rotated in common with the steering shaft and the valve quickly responds to pass fluid to the motor for the hydraulic steering assist. While the coupling of the motor shaft 18 to the steering shaft 29 suitably may allow slight modest play of rotary motion by the steering shaft (with movement of the valve driver) without operator movement of the rotor of the motor, it is also possible to couple both the valve driver and the rotor shaft rather play-free to the steering shaft. In such an arrangement, the vanes of the rotor may permit some leak or flow of hydraulic fluid between motor chamber spaces so as to allow slight rotor movement (carried to the rotor through its shaft coupled to the steering shaft) at the initiation of an operator's steering action, with the valve thereafter functioning to pass hydraulic fluid in proper quantity to the motor so as to effect strong motor rotor movement for the hydraulically assisted steering.

The invention may be embodied in other specific forms without departing from the spirit and essential characteristics thereof. Additional features may be incorporated. The illustrations of the Figures omit 0-ring seals; but such seals as well as other types of seals and even press-fitting may be employed between components in particular areas where other than modest leaks or no leaks of hydraulic fluid are desired, as will be readily appreciated by those skilled in the art. Thus, the embodiments are to be considered in all respects as illustrative and not restrictive, the scope of the invention being indicated by the appended claims rather than the foregoing description; and all changes which come within the meaning and range of equivalency of the claims as construed for validity are therefore intended to be embraced thereby.

That which is claimed is:

1. A rotary fluid motor or pump device comprising
    a housing including an outer cylindrical member and opposing plate members which form walls defining a circular interior cavity with opposing contoured annular cam surfaces equi-distantly spaced from each other at all points of equal radii from the center of said cavity, said opposing cam surfaces being on said opposing plate members, each said opposing plate member having an annular bushing fixed thereto at a central location thereof,
    a shaft extending from the exterior of said housing through at least one said bushing into said cavity,
    a rotor concentrically mounted on said shaft at a location within said cavity between said bushings and said opposing cam surfaces and dividing said cavity into two opposing chambers with said rotor therebetween, said bushings providing bushing surfaces against which a radially inward lateral surface of said rotor is adapted to rotate, said rotor consisting of a single element having at least eight radial slots equally spaced circumferentially about the peripheral portion thereof,
    a slidable vane member in each said slot of said rotor, each said vane member extending as a wall between said opposing contoured annular cam surfaces, said bushings forming at their outer annular surfaces an inner race for said vane members, said outer race for said vane members being formed by the inner surface of said outer cylindrical member of said housing, and
    two separated fluid passage systems through the walls of said housing, each said system having a single port in communication with each said chamber,
    said device being particularly characterized by the fact that each said opposing cam surface has a valley portion spaced from the rotor and a diametrically opposed hill portion nearest the rotor, with diametrically opposed uniformly graduated slopes between said valley and hill portions, each said slope extending over a circumferential arc of at least about 130°, never less than two said slidable vane members are at a location along each said slope of each said cam surface, regardless of the rotational orientation of said rotor, a circumferential arc no greater than about 50° separates said single port of one fluid passage system from said single port of the other fluid passage system in communication with a said chamber, with each said single port of communication being adjacent to end of a cam surface slope located nearest said rotor and opening on said slope, each said porting including a channel consisting of a groove on the cam surface slope for chamber communication over an arc substantially equal to the arc of the cam surface slope with which the port is associated, and at least six chamber spaces between vane members of said device are always functioning to receive fluid and at least six such chamber spaces are always functioning to exit fluid at all times during rotation of said rotor.

2. The device of claim 1 additionally characterized by the fact that the opposing chambers are identical in nature but oriented 180° from each other.

3. The device of claim 1 additionally characterized by the fact that the vanes slide through vane slots in the rotor in a direction parallel with the axis of the rotor.

* * * * *